(12) United States Patent
Takahashi et al.

(10) Patent No.: US 10,099,590 B2
(45) Date of Patent: Oct. 16, 2018

(54) HEADREST SUPPORT STRUCTURE

(71) Applicants: Gen Takahashi, Nagakute (JP); Hideyuki Kato, Toyota (JP); Hideki Kobayashi, Miyoshi (JP)

(72) Inventors: Gen Takahashi, Nagakute (JP); Hideyuki Kato, Toyota (JP); Hideki Kobayashi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 258 days.

(21) Appl. No.: 14/412,047

(22) PCT Filed: Jul. 1, 2013

(86) PCT No.: PCT/JP2013/068021
§ 371 (c)(1),
(2) Date: Dec. 30, 2014

(87) PCT Pub. No.: WO2014/007203
PCT Pub. Date: Jan. 9, 2014

(65) Prior Publication Data
US 2015/0165945 A1 Jun. 18, 2015

(30) Foreign Application Priority Data

Jul. 2, 2012 (JP) ................................ 2012-148721
Sep. 4, 2012 (JP) ................................ 2012-194313
Nov. 27, 2012 (JP) ................................ 2012-258918

(51) Int. Cl.
*B60N 2/838* (2018.01)
*B60N 2/809* (2018.01)
*B60N 2/897* (2018.01)

(52) U.S. Cl.
CPC ............. *B60N 2/838* (2018.02); *B60N 2/809* (2018.02); *B60N 2/897* (2018.02)

(58) Field of Classification Search
None
See application file for complete search history.

(56) References Cited

U.S. PATENT DOCUMENTS

| | | | | |
|---|---|---|---|---|
| 5,080,437 A | * | 1/1992 | Pesta | B60N 2/4817 248/408 |
| 2009/0261635 A1 | * | 10/2009 | Yamaguchi | B60N 2/4885 297/216.12 |

(Continued)

FOREIGN PATENT DOCUMENTS

| | | |
|---|---|---|
| DE | 101 51 360 A1 | 4/2003 |
| EP | 0 990 555 A2 | 4/2000 |

(Continued)

OTHER PUBLICATIONS

Oct. 2, 2014 Partial English-language Translation of Office Action issued in Japanese Patent Application No. 2012-148721.

*Primary Examiner* — David E Allred
(74) *Attorney, Agent, or Firm* — Oliff PLC

(57) ABSTRACT

A headrest support structure includes: a support member configured to support a protruding member projecting from a headrest; a bracket provided in a seatback and having an accommodation chamber in which the support member is accommodated in a tiltable manner in a front-rear direction perpendicular to a width direction of the headrest; a spring provided in the accommodation chamber and deforming in a bending manner due to tilting of the support member relative to the bracket in the front-rear direction; and a projection portion projecting, in the front-rear direction, from one of an outer surface of the support member and an inner surface of the bracket which are opposed to each other. The projection portion is provided at a position different from the spring in a regulation direction perpendicular to both the front-rear direction and the width direction of the headrest.

10 Claims, 13 Drawing Sheets

(56) References Cited

U.S. PATENT DOCUMENTS

| | | | |
|---|---|---|---|
| 2010/0276978 A1 | 11/2010 | Furuta et al. | |
| 2012/0112510 A1 | 5/2012 | Ishimoto et al. | |
| 2013/0127222 A1* | 5/2013 | Ishimoto | B60N 2/4838 297/404 |
| 2014/0354025 A1* | 12/2014 | Ishimoto | B60N 2/4885 297/408 |
| 2015/0145308 A1* | 5/2015 | Takahashi | B60N 2/48 297/404 |
| 2015/0145309 A1* | 5/2015 | Takahashi | B60N 2/4808 297/404 |
| 2015/0306994 A1* | 10/2015 | Kitou | B60N 2/4838 297/408 |
| 2016/0082869 A1* | 3/2016 | Takahashi | B60N 2/4808 297/404 |
| 2016/0166064 A1* | 6/2016 | Takahashi | B60N 2/4808 297/404 |

FOREIGN PATENT DOCUMENTS

| | | | |
|---|---|---|---|
| EP | 2 119 603 A1 | 11/2009 | |
| JP | S61-149552 U | 9/1986 | |
| JP | 2000-102444 A | 4/2000 | |
| JP | 2001-233108 A | 8/2001 | |
| JP | 2005-137848 A | 6/2005 | |
| JP | 2005-170144 A | 6/2005 | |
| JP | 2009-183695 A | 8/2009 | |
| JP | 2010-194246 A | 9/2010 | |
| JP | WO 2010150372 A1 * | 12/2010 | B60N 2/4228 |
| JP | 2011-098595 A | 5/2011 | |
| JP | 2011-201526 A | 10/2011 | |
| JP | 2011-207335 A | 10/2011 | |
| WO | 2010/150372 A1 | 12/2010 | |

* cited by examiner

HEADREST SUPPORT STRUCTURE

TECHNICAL FIELD

The present invention relates to a headrest support structure in which a headrest is elastically supported by a seatback.

BACKGROUND ART

For the purpose of a reduction in fuel consumption of a vehicle, an engine speed during idling of an engine is slowed down. As a result, a frequency spectrum of engine vibration during the idling includes a resonance frequency of a vehicle seat, which causes a decrease in drivability. In view of this, in recent years, such a seat has been developed that when an exciting force is transmitted to the seat, a headrest is caused to swing relative to a seatback in a front-rear direction, so as to damp vibration of the seat in the front-rear direction.

Patent Document 1 describes one example of a headrest support structure in which a headrest is elastically supported by a seatback. The support structure includes a tubular bracket provided in the seatback, and a support member that supports a tip portion of a headrest stay projecting from a headrest, and the support member is accommodated in an accommodation chamber of the bracket in a state where the support member can tilt in a front-rear direction. Further, springs are provided at two different positions in a regulation direction where the headrest stay extends, between an outer surface of the support member and an inner surface of the bracket. When an exciting force is transmitted to a seat, the headrest swings relative to the seatback around a fulcrum set between the springs in the regulation direction, so as to damp vibration of the seat.

CITATION LIST

Patent Documents

Patent Document 1: Japanese Patent Application Publication No. 2011-207335 (JP 2011-207335 A)
Patent Document 2: Japanese Patent Application Publication No. 2011-201526 (JP 2011-201526 A)

SUMMARY OF THE INVENTION

Problem to be Solved by the Invention

In the support structure, a position, in the regulation direction, of the fulcrum serving as a center of the swinging of the headrest could be displaced due to an individual difference in characteristics between the paired springs, deviation in attachment of the springs, and the like. On that account, a seat-vibration damping characteristic is easy to vary.

In order to deal with such a problem, there is such a method that a spindle projecting in a vehicle width direction is provided in a support member, and a support portion that rotatably supports the spindle is provided in a bracket, as described in Patent Document 2, for example. In this case, the support member is attached to the bracket so that the spindle is supported by the support portion, and hereby, the headrest swings in a front-rear direction with the spindle being taken as a fulcrum. As a result, variation in a position of the fulcrum in the regulation direction is suppressed, thereby making it possible to restrain variation in the seat-vibration damping characteristic. However, the provision of the spindle and the support portion causes a new problem with a complexity of a configuration of the support member and the bracket.

An object of the disclosure is to provide a headrest support structure that can restrain, with a simple configuration, variation in a damping characteristic of vibration occurring in a seat.

Means for Solving the Problem

A headrest support structure to achieve the above object includes: a support member configured to support a protruding member projecting from a headrest; a bracket provided in a seatback and having an accommodation chamber in which the support member is accommodated in a tiltable manner in a front-rear direction perpendicular to a width direction of the headrest; a spring provided in the accommodation chamber and deforming in a bending manner due to tilting of the support member relative to the bracket in the front-rear direction; and a projection portion projecting in the front-rear direction from one of an outer surface of the support member and an inner surface of the bracket which are opposed to each other, the projection portion being provided at a position different from the spring in a regulation direction perpendicular to both the front-rear direction and the width direction of the headrest.

In the configuration, regardless of individual difference of the spring and attachment deviation of the spring, the support member that supports the headrest via the protruding member tilts in the front-rear direction with the projection portion being taken as a fulcrum. This makes it hard to cause positional deviation of a swing center of the headrest at the time when the headrest swings relative to the seatback in the front-rear direction. This accordingly makes it possible to restrain, with a simple configuration, variation in a damping characteristic of vibration occurring in a seat.

Note that the projection portion may be provided at a position farther from the headrest than the spring in the regulation direction, but it is preferable that the projection portion be provided at a position closer to the headrest than the spring in the regulation direction. By employing the configuration, the projection portion, which is a swing center of the headrest, is provided close to the headrest, so that a displacement amount of the support member in the front-rear direction with respect to the swing of the headrest in the front-rear direction is increased, as compared with a configuration in which the projection portion is provided at a position farther from the headrest than the spring in the regulation direction. Hereby, even if an allowable displacement amount of the support member in the front-rear direction is decreased as compared with the configuration in which the projection portion is provided at a position farther from the headrest than the spring, a swing range of the headrest in the front-rear direction is hard to be narrowed. As a result, it is possible to restrain a decrease in a vibration damping characteristic.

In the meantime, in the above headrest support structure, the spring may be placed on a first side relative to the protruding member in the front-rear direction; and the projection portion may be placed on a second side relative to the protruding member in the front-rear direction. Particularly, it is preferable that the spring be placed on a rear side of the protruding member, and the projection portion be placed on a front side of the protruding member.

Further, it is preferable that a gap filling body be provided in a gap between the outer surface of the support member and the inner surface of the bracket which are opposed to each other, on the first side relative to the protruding member in the front-rear direction. The gap filling body is placed at the same position as the projection portion, more preferably on a side opposite to the spring across the projection portion in the regulation direction. Hereby, as compared with a case where the gap filling body is placed between the projection portion and the spring in the regulation direction, bending deformation of the spring at the time when the support member tilts toward the first side in the front-rear direction around the projection portion is hard to be limited by the gap filling body, thereby resulting in that the swing range of the headrest is widened. Accordingly, damping efficiency of vibration of the seat due to a transmitted exciting force can be increased.

Further, it is preferable that a second gap filling body be provided in a gap between the outer surface of the support member and the inner surface of the bracket which are opposed to each other, on the second side relative to the protruding member in the front-rear direction. The second gap filling body is placed at a position closer to the spring than the projection portion in the regulation direction. Hereby, it is possible to increase a support rigidity of the headrest relative to an impact to the headrest from the second side in the front-rear direction.

Note that it is preferable that the second gap filling body be placed at the same position as the spring in the regulation direction.

Here, in order to set a resonance frequency of the seat to be low, it is preferable not only to lower the support rigidity of the headrest, but also to increase a weight of the headrest displaceable relative to the seatback that can be considered as a rigid body. In view of this, in order to increase the weight of the headrest, a headrest in which a weight harder than a cushioning material is embedded in the cushioning material may be employed. By making the headrest heavy while lowering the support rigidity of the headrest as such, the resonance frequency of the seat can be decreased more.

Note that, in the headrest support structure, it is preferable to place the spring so as to be able to bias the headrest rearward. According to this configuration, even if a head of an occupant sitting on a seat hits on the headrest from its front side, the spring does not further deform in a bending manner, thereby making it possible to restrain swing of the head of the occupant in the front-rear direction.

MODES FOR CARRYING OUT THE INVENTION

The following descries a first embodiment of a headrest support structure to be applied to a seat provided in a vehicle, according to FIGS. 1 to 7. Note that, in the present embodiment, a side relative to a headrest on which side a head of a person sitting on a seat is placed is assumed a "front side," and a side reverse to it is assumed a "rear side." Further, a seat width direction is the same direction as a vehicle width direction, and a regulation direction that is a direction perpendicular to both the vehicle width direction and a vehicle front-rear direction is referred to as an "up-down direction."

Figure 1:
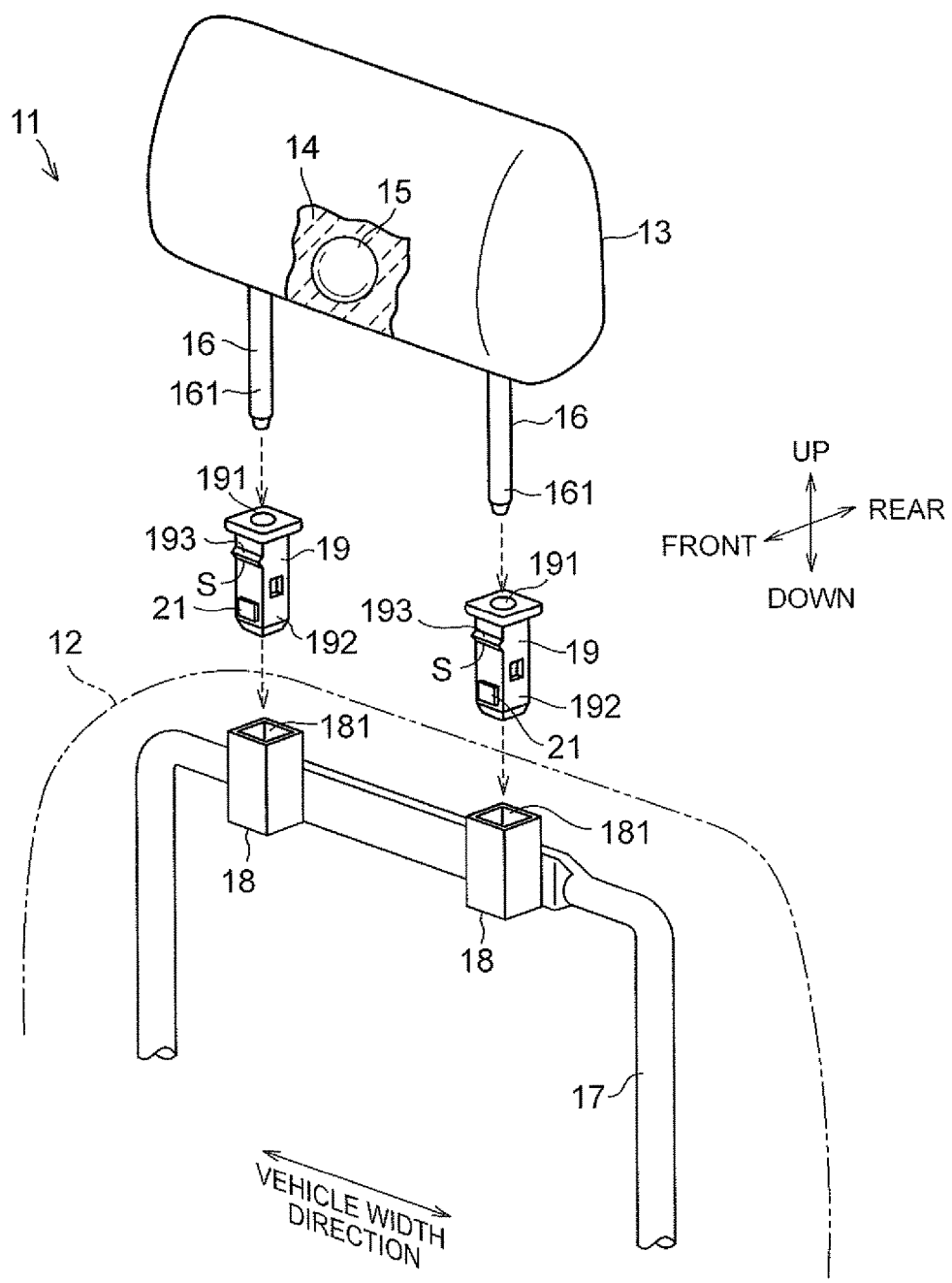
FIG. 1 is an exploded perspective view illustrating a first embodiment of a headrest support structure.

As illustrated in FIG. 1, a seat 11 includes a seatback 12 that supports a back of an occupant, and the seatback 12 elastically supports a headrest 13 in a state where the headrest 13 is swingable in the front-rear direction. The headrest 13 includes a cushioning material 14 for impact absorption, and a weight 15 made of a material (e.g., a metal such as iron) that is harder than the cushioning material 14 is embedded in the cushioning material 14. Further, the headrest 13 is provided with a pair of headrest stays 16 as an example of a protruding member. The headrest stays 16 are provided side by side along the vehicle width direction, and each include a tip portion 161 projecting from the headrest 13 toward the seatback 12.

A seatback frame 17 is provided in the seatback 12, and two support brackets 18 are provided on an upper part of the seatback frame 17 at an interval in the vehicle width direction. Each of the support brackets 18 is made of metal in a squarely cylindrical shape, and fixed to the seatback frame 17 by welding or the like. The support bracket 18 extends in the up-down direction. That is, an axis of the support bracket 18 extends in the up-down direction (the regulation direction).

Figure 2:
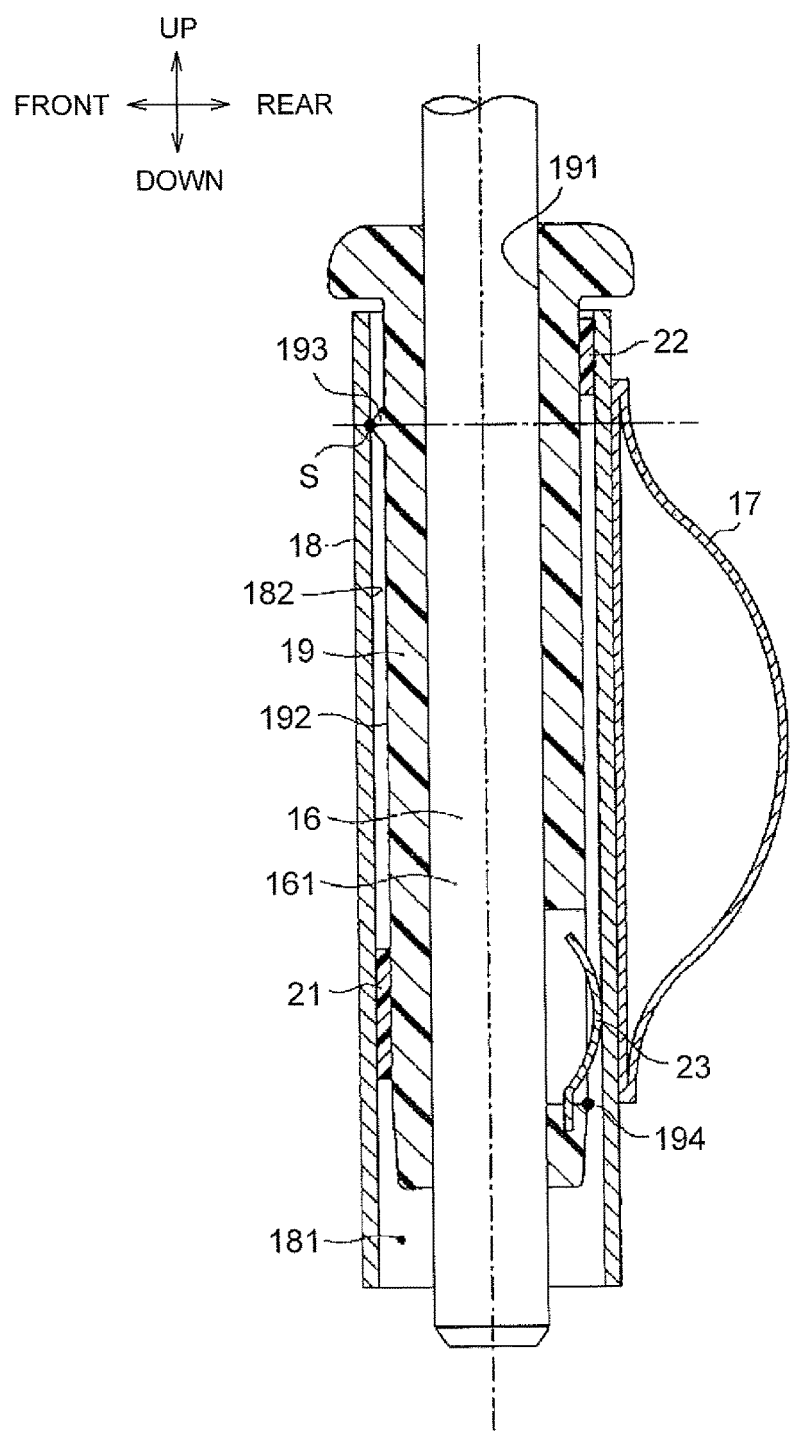
FIG. 2 is a sectional view illustrating a headrest support structure of FIG. 1.

As illustrated in FIGS. 1, 2, an internal space of the support bracket 18 forms an accommodation chamber 181 opened toward a side opposed to the headrest 13 and its opposite side (that is, toward both top and bottom sides). A headrest support 19 as a support member is inserted into the accommodation chamber 181 from an upper opening. The headrest support 19 is made of synthetic resin, for example. By inserting the tip portion 161 of the headrest stay 16 into the headrest support 19, the headrest 13 is elastically supported by the seatback frame 17.

A lower end portion of the headrest support 19 is formed to be tapered. Further, a stay hole 191 is formed in the headrest support 19 so as to penetrate therethrough in the up-down direction, and the tip portion 161 of the headrest stay 16 is inserted into the stay hole 191 from its upper opening. Note that, in the present embodiment, the tip portion 161 of the headrest stay 16 penetrates through the stay hole 191.

A mound-shaped projection portion 193 projecting forward is provided on a front side of an upper part of an outer surface 192 of the headrest support 19 so as to extend in the vehicle width direction. That is, the projection portion 193 projects from the outer surface 192 of the headrest support 19 toward that inner surface 182 of the support bracket 18 which is opposed to the outer surface 192. A tip of the projection portion 193 abuts with the inner surface 182 of the support bracket 18.

Further, a first bead 21 is provided on a front side of a lower part of the headrest support 19, as a second gap filling body that fills a gap between the outer surface 192 of the headrest support 19 and the inner surface 182 of the support bracket 18 which are opposed to each other. The first bead 21 is made of the same synthetic resin as the headrest support 19, for example, and has about the same height (that is, a length in the front-rear direction) of the projection portion 193. Note that the first bead 21 may be formed integrally with the headrest support 19, or may be formed separately from the headrest support 19 and be fixed thereto later by adhesion or the like.

Further, a second bead 22 is provided at a position on a rear side relative to the headrest stay 16 and an upper side relative to the projection portion 193, as a first gap filling body that fills a gap between the outer surface 192 of the headrest support 19 and the inner surface 182 of the support bracket 18 which are opposed to each other. The second bead 22 is made of the same synthetic resin as the headrest support 19, for example, similarly to the first bead 21. Note that the second bead 22 may be formed integrally with the headrest support 19, or may be formed separately from the headrest support 19 and be fixed thereto later by adhesion or the like.

Further, a metal leaf spring 23 supported by the headrest support 19 is provided on a rear side of a lower part of the headrest stay 16. That is, the leaf spring 23 is placed on a side opposite to the second bead 22 across the projection portion 193 in the up-down direction and at the same position as the first bead 21. The leaf spring 23 is a cantilever spring having a fixed end in its lower end and a free end in its upper end. The leaf spring 23 gives a biasing force to the headrest support 19 so as to exhibit a biasing force to tilt the headrest 13 rearward relative to the seatback 12. Thus, the tip of the projection portion 193 is pressed against the inner surface 182 of the support bracket 18.

That part of the outer surface 192 which is placed on a rear side of the headrest support 19 and on a lower side of the leaf spring 23 functions as a topper portion 194 abuttable with the inner surface 182 on a rear side of the support bracket 18.

Figure 3:
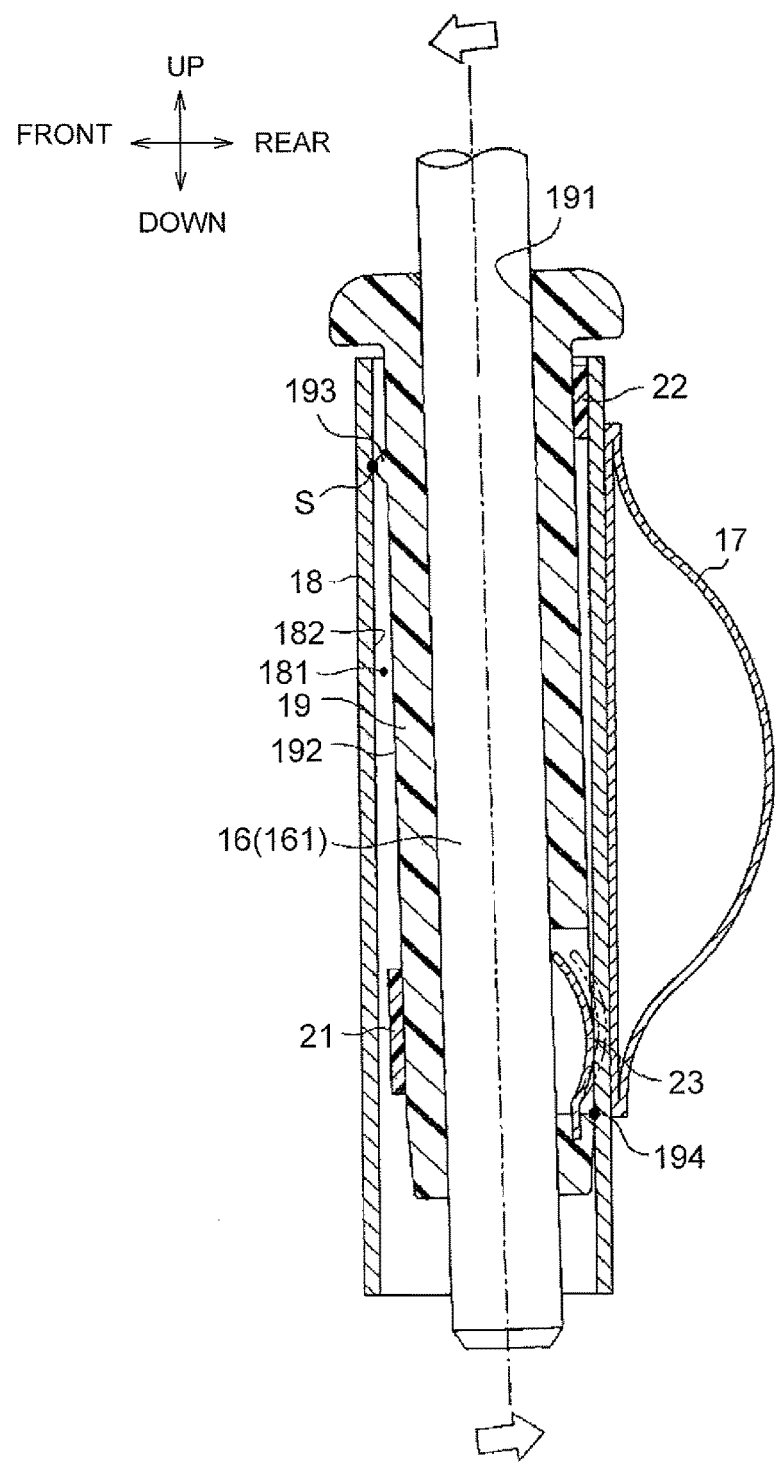
FIG. 3 is a sectional side view of the headrest support structure of FIG. 2 when a headrest is displaced forward.

As illustrated in FIGS. 2 and 3, the headrest support 19 can tilt in the front-rear direction relative to the support bracket 18 with the tip of the projection portion 193 being taken as a fulcrum S. On the occasion of tilting of the headrest support 19 in a counterclockwise direction in FIG. 3, a reaction force is generated due to flexion of the leaf spring 23. A tilting range of the headrest support 19 is from a position where the first bead 21 provided on a front lower part of the headrest support 19 abuts with the inner surface 182 on a front side of the support bracket 18 to a position where the stopper portion 194 provided on a rear lower part of the headrest support 19 abuts with the inner surface 182 on a rear side of the support bracket 18.

Figure 4:
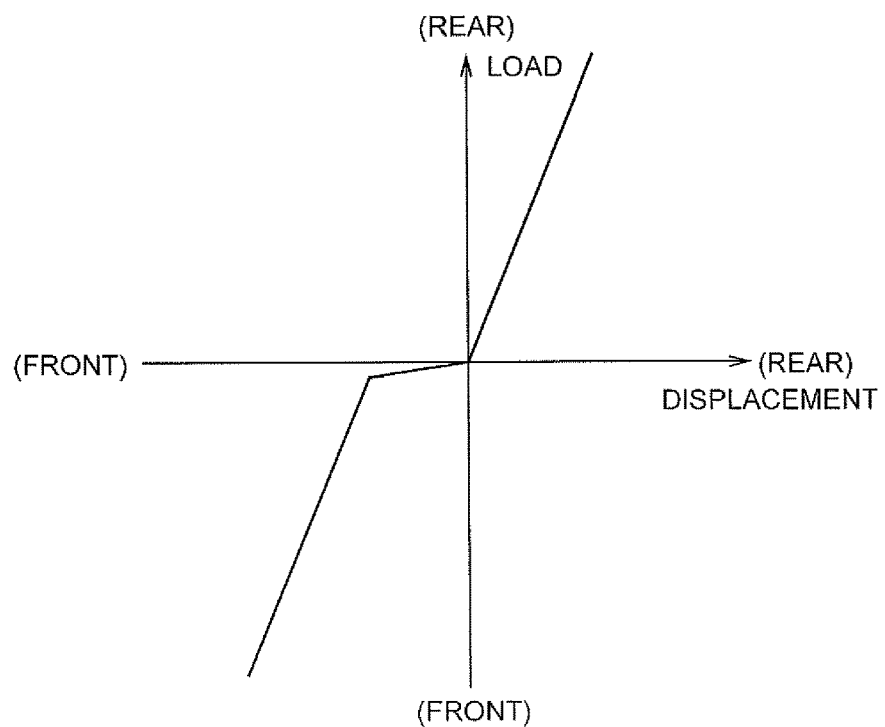
FIG. 4 is a graph showing a relationship between displacement of the headrest and a load required for the displacement.
Figure 5:
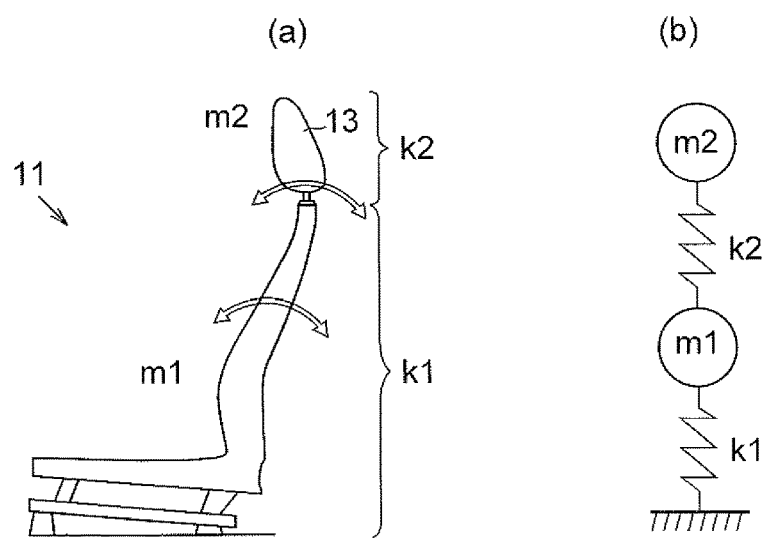
FIG. 5(*a*) is a side view schematically illustrating a seat of a vehicle, and FIG. 5(*b*) is a schematic view illustrating a spring-mass model relative to vibration of the seat in a front-rear direction.

Referring now to FIGS. 4 and 5, an operation of the headrest support structure of the present embodiment is described below.

When the headrest 13 is displaced forward, the headrest support 19 into which the tip portion 161 of the headrest stay 16 is inserted tilts relative to the support bracket 18 in the counterclockwise direction in FIG. 3 around the tip of the projection portion 193 as the fulcrum S. On the occasion of the tilting, the leaf spring 23 is pressed against the inner surface 182 of the support bracket 18 on the rear side so as to be bent, so that a resistance to the displacement of the headrest 13 is generated.

When a displacement amount of the headrest 13 toward its front side reaches a given amount, the stopper portion 194 abuts with the inner surface 182 of the support bracket 18 on the rear side, so that further tilting of the headrest support 19 is prevented. Accordingly, further forward displacement of the headrest 13 is performed by elastic deformation of the headrest stay 16 or the like.

Here, a support structure of a first comparative example in which a second bead 22 is placed at a position between a projection portion 193 and a leaf spring 23 in the up-down direction is described. In the first comparative example, at the time when a headrest support 19 tilts along with forward displacement of a headrest 13, the tilting is limited by the second bead 22. As a result, a tilting range of the headrest support 19 is narrowed, so that further tilting of the headrest support 19 is regulated before a stopper portion 194 provided on a rear side of a lower part of the headrest support 19 abuts with an inner surface 182 of a support bracket 18.

On the other hand, in the present embodiment, the second bead 22 is placed on the upper side relative to the projection portion 193 and is not placed on the lower side relative to the projection portion 193, so that the headrest support 19 tilts in the counterclockwise direction in FIG. 3 without being limited by the second bead 22. That is, the tilting of the headrest support 19 is allowed up to the position where the stopper portion 194 abuts with the inner surface 182 of the support bracket 18. Accordingly, a swing range of the headrest 13 is enlarged as compared with the case of the first comparative example.

In the meantime, on the occasion of rearward displacement of the headrest 13, since the first bead 21 abuts with the inner surface 182 of the support bracket 18 on the front side, the tilting of the headrest support 19 relative to the support bracket 18 is regulated from the beginning. Accordingly, the rearward displacement of the headrest 13 is performed by elastic deformation of the headrest stay 16 or the like from the beginning.

Accordingly, a relationship between the displacement amount of the headrest 13 in the front-rear direction and a load necessary for the displacement is shown in FIG. 4. That is, a region where a support rigidity of the headrest 13 is small is set from an initial position with a displacement amount of "0," that is, from an initial position of the headrest 13 under no external force, toward the front side. Note that, with respect to forward displacement of more than a given amount and rearward displacement from the initial position, the support rigidity of the headrest 13 becomes large. That is, in the seat 11 of the present embodiment, minute swing (vibration) of the headrest 13 relative to the seatback frame 17 is allowed. On that account, when an exciting force is transmitted from a vehicle body to the seat 11 and vibration in the front-rear direction due to the exciting force occurs in the seat 11, the headrest 13 swings relative to the seatback 12 in the front-rear direction with the tip of the projection portion 193 being taken as the fulcrum S, so that the vibration of the seat 11 is damped.

Note that the headrest support structure exhibits a high support rigidity with respect to the rearward displacement of the headrest 13, and therefore, when a vehicle has a rear-end collision, a head of an occupant can be surely received by the headrest 13.

Here, vibration of the seat 11 in the front-rear direction as illustrated in FIG. 5(a) is described with reference to a spring-mass model of two degrees of freedom as illustrated in FIG. 5(b). In FIGS. 5(a) and 5(b), "m1" indicates an equivalent mass of a seat framework constituted by a rail and the seatback frame 17, and "m2" indicates an equivalent mass of the headrest 13. Further, "k1" indicates an equivalent rigidity of the seat framework, and "k2" indicates an equivalent rigidity of the headrest support structure.

When the support rigidity of the headrest 13 with respect to the seat framework is sufficiently small, the headrest 13 functions as a mass system of a dynamic damper of the seat 11, so that a resonance frequency of the seat 11 is decreased. An effect of the decrease in the resonance frequency at this time becomes large as the equivalent mass m2 of the headrest 13 is increased or as the equivalent rigidity k2 of the headrest support structure is decreased.

In this regard, the weight 15 is provided inside the headrest 13 of the present embodiment. This increases a weight of the headrest 13, thereby making it possible to increase the equivalent mass m2 of the headrest 13. As a result, the resonance frequency of the seat 11 is decreased.

Further, in a support structure of a second comparative example in which a leaf spring 23 is placed in an upper part and a projection portion 193 is placed in a lower part, the projection portion 193 is placed at a position distanced from a headrest 13. In this case, when a swing range of the headrest 13 with a tip of the projection portion 193 being taken as a fulcrum S is assumed the same in the present embodiment and in the second comparative example, an allowable width of the displacement, in the front-rear direction, of the stopper portion 194 provided on the rear side of the lower part of the headrest support 19 is narrower in the second comparative example. In other words, the present embodiment achieves a wider allowable width of the displacement of the stopper portion 194 in the front-rear direction, as compared with the case of the second comparative example.

Figure 6:
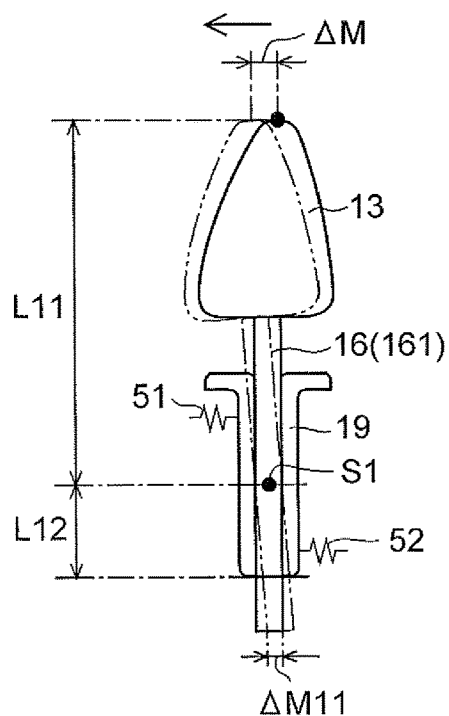
FIG. 6 is a schematic view illustrating a headrest support structure of a third comparative example.
Figure 7:
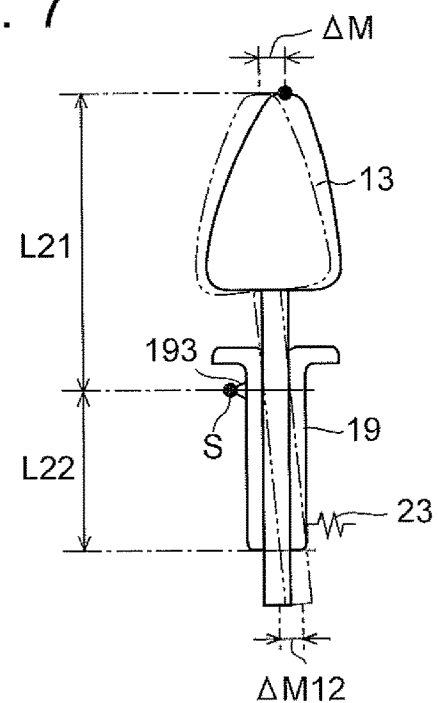
FIG. 7 is a schematic view illustrating the headrest support structure of the first embodiment.

Referring now to FIGS. 6 and 7, the following describes an operation at the time when the headrest 13 is attached to the seatback 12. Note that FIG. 6 is a schematic view of a support structure of a third comparative example, and FIG. 7 is a schematic view of the support structure of the present embodiment.

As illustrated in FIG. 6, the support structure of the third comparative example is configured such that a first spring 51 is provided instead of the projection portion 193, and a second spring 52 is provided instead of the leaf spring 23. In this case, a headrest support 19 tilts around a fulcrum S1 set between the springs 51, 52 in the up-down direction.

Here, the headrest support structure allows the headrest 13 to be placed forward from a reference position indicated by a continuous line in FIGS. 6 and 7, just by a displacement allowable amount $\Delta M$. In this case, a swing width of the headrest 13 in the front-rear direction in design is the displacement allowable amount $\Delta M$. However, due to a tolerance or the like of each component, an actual swing width of the headrest 13 in the front-rear direction is narrower than the displacement allowable amount $\Delta M$. In order to restrain a decrease in vibration damping performance of the headrest support structure, it is preferable to widen the swing width of the headrest 13 as much as possible.

In the third comparative example, a distance from the fulcrum S1 to an upper end of the headrest 13 along the up-down direction is a first distance L11, and a distance from the fulcrum S1 to a lower end of the headrest support 19 along the up-down direction is a second distance L12. In this case, when the headrest 13 is displaced forward by the displacement allowable amount $\Delta M$ from the reference position, the lower end of the headrest support 19 is displaced rearward only by a first displacement amount $\Delta M11$ from the reference position indicated by the continuous line in FIG. 6. The first displacement amount $\Delta M11$ is expressed by the following relationship (Formula 1).

$$\Delta M11 = \Delta M \times (L12/L11) \quad \text{(Formula 1)}$$

In the meantime, as illustrated in FIG. 7, in the present embodiment, a distance from the fulcrum S to the upper end of the headrest 13 along the up-down direction is a first distance L21, which is shorter than the first distance L11, and a distance from the fulcrum S to the lower end of the headrest support 19 along the up-down direction is a second distance L22, which is longer than the second distance L12. In this case, when the headrest 13 is displaced forward just by the displacement allowable amount $\Delta M$ from the reference position, the lower end of the headrest support 19 is displaced rearward only by a second displacement amount $\Delta M12$ from the reference position indicated by the continuous line in FIG. 7. The second displacement amount $\Delta M12$ is expressed by the following relationship (Formula 2).

$$\Delta M12 = \Delta M \times (L22/L21) \quad \text{(Formula 2)}$$

There are tolerances in the headrest support 19 and the support bracket 18 constituting the headrest support structure in manufacture. Accordingly, if an outside diameter of the headrest support 19 is larger than a design value or an inside diameter of the support bracket 18 is smaller than a design value, a gap between the outer surface 192 of the headrest support 19 and the inner surface 182 of the support bracket 18 is narrowed. In this case, rearward displacement of the lower end of the headrest support 19 is limited due to the tolerances of the headrest support 19 and the support bracket 18.

For example, the rearward displacement of the lower end of the headrest support 19 is limited only by a regulated amount $\Delta M3$ ($<\Delta M11$, $\Delta M12$). In this case, in the third comparative example, an actual first displacement amount of the lower end of the headrest support 19 toward its rear side is equal to a value obtained by deducting the regulated amount $\Delta M3$ from the first displacement amount $\Delta M11$ calculated by use of the relationship (Formula 1). Further, in the present embodiment, an actual second displacement amount of the lower end of the headrest support 19 toward its rear side is equal to a value obtained by deducting the regulated amount $\Delta M3$ from the second displacement amount $\Delta M12$ calculated by use of the relationship (Formula 2), and is a value larger than the actual first displacement amount.

As a result, in the support structure of the present embodiment, a position of the headrest 13 in the front-rear direction in a steady state is placed on a rear side as compared with the support structure of the third comparative example. That is, an actual swing width of the headrest 13 in the front-rear direction becomes wider than the support structure of the third comparative example. Accordingly, in the support structure of the present embodiment, the actual swing width is hard to be narrowed as compared with the support structure of the third comparative example, so vibration damping efficiency is hard to decrease.

Note that the same can be true to a comparison between the second comparative example and the present embodiment. That is, by placing the projection portion 193 at a position close to the headrest 13, the actual swing width of the headrest 13 in the front-rear direction is widened, so vibration damping efficiency increases.

As described above, in the present embodiment, the following effect can be obtained.

(1) Regardless of individual difference of the spring and attachment deviation of the spring, the headrest support 19 that supports the headrest 13 via the headrest stay 16 tilts in the front-rear direction with the tip of the projection portion 193 being taken as the fulcrum S. This makes it hard to cause positional deviation, in the up-down direction, of a swing center of the headrest 13 at the time when the headrest 13 swings relative to the seatback 12 in the front-rear direction. This accordingly makes it possible to restrain, with a simple configuration, variation in a damping characteristic of vibration occurring in the seat 11.

(2) Since the headrest 13 is caused to swing in the front-rear direction with taking, as the fulcrum S, the tip of the projection portion 193 placed at a position close to the headrest 13, it is possible to lengthen the distance from the center of the swing to the lower end of the headrest support 19 as comparison with the support structures of the third comparative example and the second comparative example. As a result, as compared with the third comparative example and the second comparative example, the actual swing width of the headrest 13 in the front-rear direction is hard to be narrowed, so vibration damping efficiency can increase.

Further, those tolerances of the headrest support 19 and the support bracket 18 which are required to secure a given swing width or more of the headrest 13 in the front-rear direction can be increased as compared with the cases of the second comparative example and the third comparative example. On that account, the headrest support 19 and the support bracket 18 can be easily manufactured.

Particularly, in the present embodiment, the projection portion 193 is provided on the front side of the upper part of the headrest support 19 and the leaf spring 23 is provided on the rear side of the lower part of the headrest support 19. Such a configuration makes it hard for the center (the fulcrum) S of the tilting of the headrest support 19 relative to the support bracket 18 to vibrate, so that vibration of the headrest 13 is easily controlled. Accordingly, it is possible to more precisely set a damper characteristic of the headrest 13.

(3) Since the second bead 22 is placed on an opposite side to the leaf spring 23 across the projection portion 193 in the up-down direction, bending of the leaf spring 23 at the time when the headrest support 19 tilts forward with the tip of the projection portion 193 being taken as the fulcrum S is hard to be limited by the second bead 22 as compared with the case of the support structure of the first comparative example. This consequently makes it possible to enlarge the swing range of the headrest 13 in the front-rear direction. Accordingly, when an exciting force is transmitted to the seat 11, damping efficiency of vibration of the seat 11 due to the exciting force can be increased.

(4) Further, since the first bead 21 is provided on the front side of the lower part of the accommodation chamber 181 and the second bead 22 is placed on the upper side relative to the projection portion 193, the rearward displacement of the headrest 13 is regulated. Accordingly, when a vehicle provided with the seat 11 of the present embodiment has a rear-end collision, a head of an occupant can be surely received by the headrest 13.

(5) By providing the weight 15 in the headrest 13, it is possible to make the headrest 13 heavy. This makes it possible to decrease the resonance frequency of the seat 11, so that damping efficiency of vibration of the seat 11 can be improved.

(6) In the present embodiment, the leaf spring 23 is placed to bias the headrest 13 rearward. When an impact is applied to the headrest 13 from its front side, the leaf spring 23 does not further deform in a bending manner, and the rearward displacement of the headrest 13 is regulated. Accordingly, when a vehicle provided with the seat 11 of the present embodiment has a rear-end collision, a head of an occupant can be surely received by the headrest 13.

Further, when an impact is applied to the headrest 13 from its rear side, the headrest 13 is displaced forward against the biasing force from the leaf spring 23, so that the impact can be relaxed.

Figure 8:
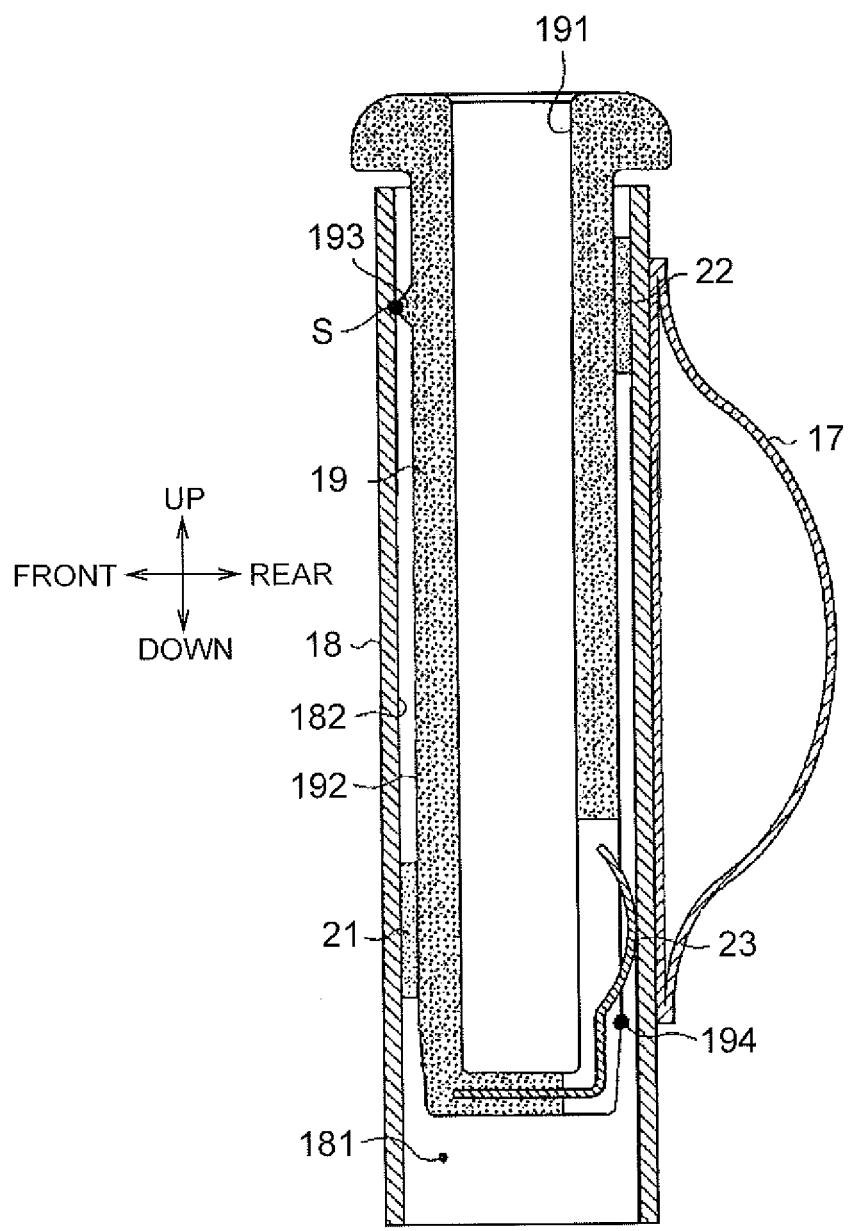
FIG. 8 is a sectional view illustrating a second embodiment of a headrest support structure.
Figure 9:
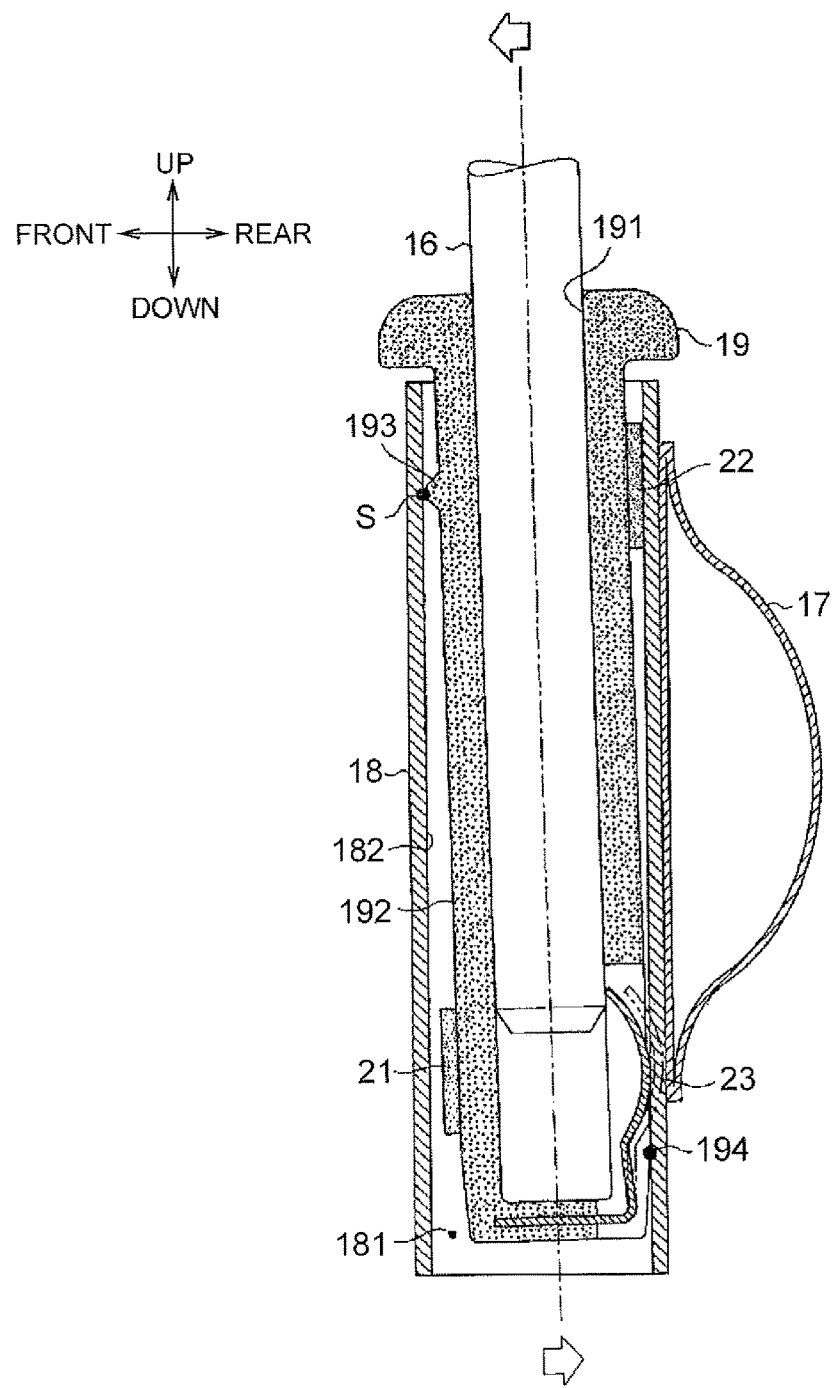
FIG. 9 is a sectional side view of the headrest support structure of FIG. 8 when a headrest is displaced forward.
Figure 10:
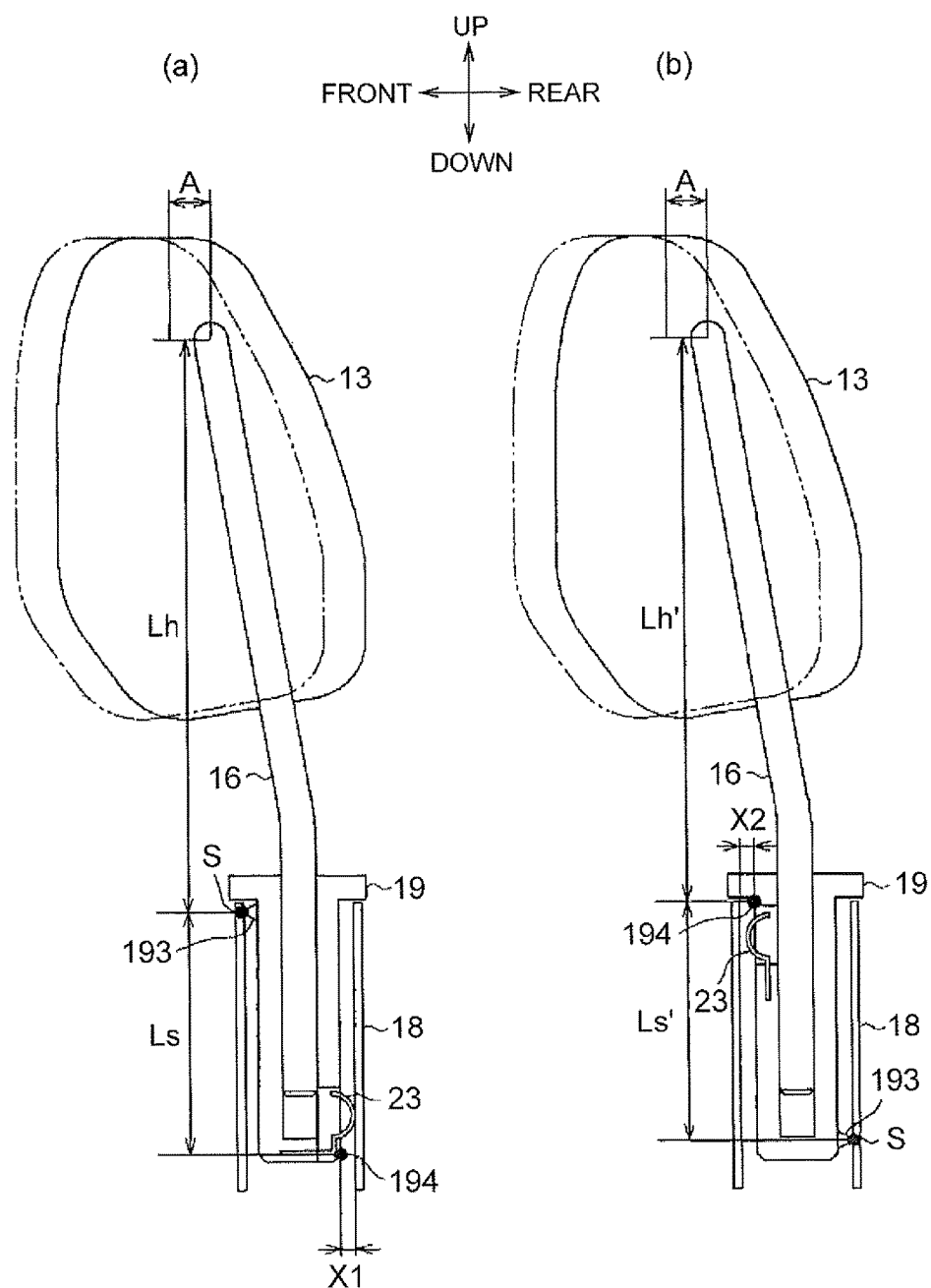
FIG. 10(*a*) is a schematic view illustrating the headrest support structure of the second embodiment, and FIG. 10(*b*) is a schematic view illustrating a headrest support structure of a fourth comparative example.

In regard to a second embodiment of a headrest support structure, the following mainly describes differences from the first embodiment, with reference to FIGS. 8 to 10.

As illustrated in FIGS. 8 and 9, a headrest support 19 includes, in its lower end, a bottom portion that closes the lower end. A leaf spring 23 is disposed in a state where a lower end region thereof extending horizontally is embedded in the bottom portion of the headrest support 19. Further, in the present embodiment, a second bead 22 is placed at the same position as a projection portion 193 in the up-down direction. The other configuration is basically the same as the first embodiment.

FIG. 10(a) is a schematic view of the support structure of the present embodiment, and FIG. 10(b) is a schematic view of a support structure of a fourth comparative example. The fourth comparative example corresponds to a configuration in which the placements of the projection portion 193 and the leaf spring 23 in the present embodiment are replaced.

In FIG. 10(a) and FIG. 10(b), the headrest 13 can be displaced, due to swing of the headrest support 19 relative to a support bracket 18, from a reference position indicated by a continuous line to a position indicated by an alternate long and two short dashes line (a position where a stopper portion 194 abuts with an inner surface 182 of the support bracket 18). An allowable upper limit of the displacement amount of the headrest 13 is indicated by "A."

As illustrated in FIG. 10(a), in the present embodiment, in order to restrain a displacement amount of the headrest 13 to "A" or less, it is necessary to set a displacement amount X1 of the stopper portion 194 to Formula 3 as follows. Note that "Ls" in the following formula indicates a distance from a center S (a tip of the projection portion 193) of tilting of the headrest support 19 to the stopper portion 194, and "Lh" indicates a distance from an upper part of the headrest 13 to the center S.

$$X1 \leq A \times Ls/Lh \qquad \text{(Formula 3)}$$

In the meantime, as illustrated in FIG. 10(b), in the configuration of the fourth comparative example in which a position of the projection portion 193 is replaced with a position of the leaf spring 23, in order to restrain a displacement amount of the headrest 13 to "A" or less, it is necessary to set a displacement amount X2 of the stopper portion 194 to Formula 4 as follows. Incidentally, in the fourth comparative example, the stopper portion 194 is placed above the leaf spring 23, on the front side of the headrest support 19. Note that "Ls'" in Formula 4 indicates a distance from the stopper portion 194 to a center S (a tip of the projection portion 193) of tilting of the headrest support 19, and "Lh'" indicates a distance from an upper part of the headrest 13 to the stopper portion 194.

$$X2 \leq A \times Ls'/(Lh'+Ls') \quad \text{(Formula 4)}$$

If the headrest stays 16, the headrest supports 19, and the like have the same sizes, the distance Ls is approximately equal to the distance Ls', and the distance Lh is approximately equal to the distance Lh'. Accordingly, a configuration in which the projection portion 193 and the leaf spring 23 are placed as described in the present embodiment can increase a displacement amount of the stopper portion 194 from the reference position to a position where the stopper portion 194 abuts with the inner surface 182 of the support bracket 18 (an allowable maximum value of the displacement amount X1>an allowable maximum value of the displacement amount X2).

Here, in a case where the same support characteristic is set to the headrest 13, as the displacement amount of the stopper portion 194 from the reference position to the position where the stopper portion 194 abuts with the inner surface 182 of the support bracket 18 is larger, a necessary spring rate of the leaf spring 23 to obtain the support characteristic is reduced more. In the meantime, if a bending amount of the leaf spring 23 at the reference position varies due to variation in inside diameter of the support bracket 18 and in outside diameter of the headrest support 19 in the stopper portion 194, deviation in mounting position of the support bracket 18 due to welding stress or the like, thermal expansion of each member, and the like, the support characteristic of the headrest 13 changes. However, if a magnitude of deviation in the bending amount of the leaf spring 23 at the reference position is the same, the change in the support characteristic of the headrest 13 due to the deviation can be restrained more as the spring rate of the leaf spring 23 is smaller. Accordingly, variation in the damper characteristic of the headrest 13 can be restrained more in the configuration of the present embodiment than in the configuration of the fourth comparative example.

Figure 11:
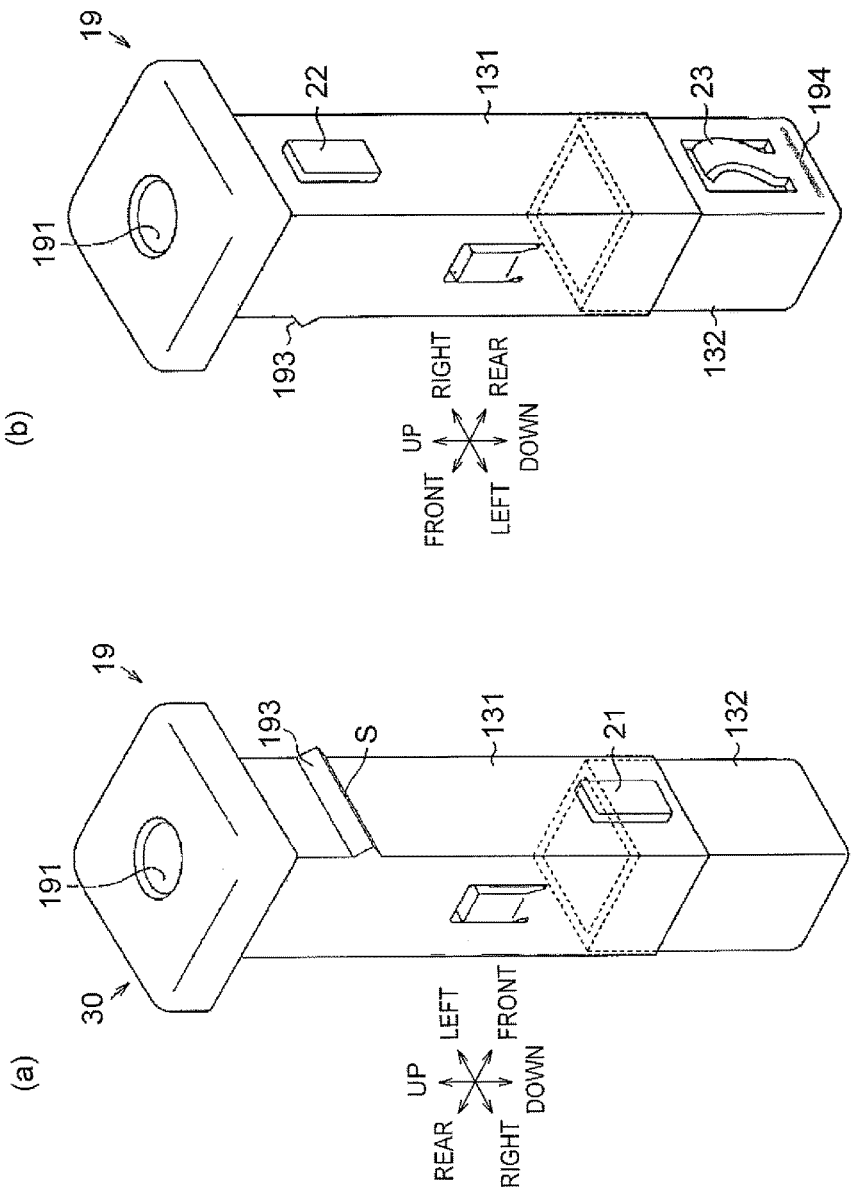
FIGS. 11(*a*) and 11(*b*) are perspective views each illustrating a headrest support according to a third embodiment.
Figure 12:
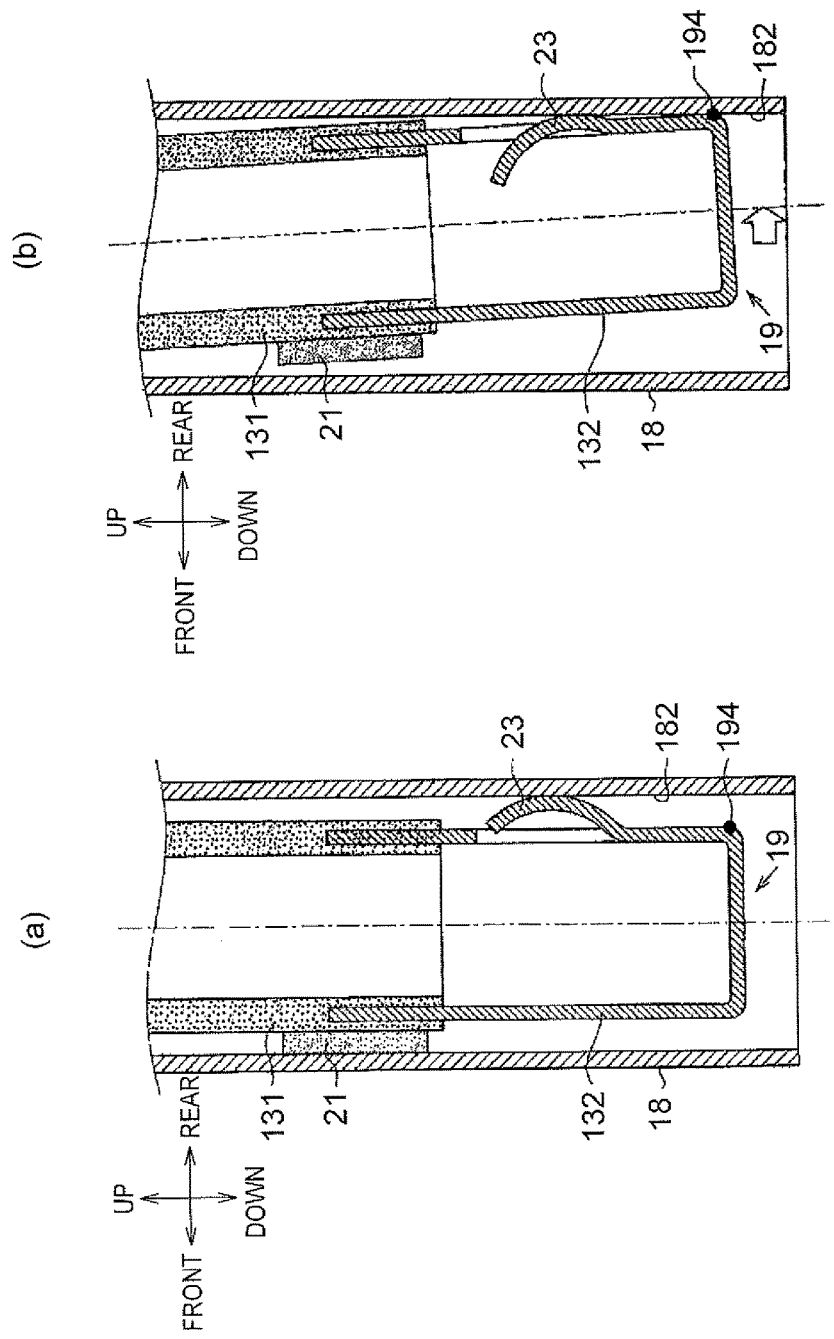
FIGS. 12(*a*) and 12(*b*) are schematic views each illustrating a headrest support structure according to the third embodiment.

In regard to a third embodiment of a headrest support structure, the following mainly describes differences from the second embodiment with reference to FIGS. 11 and 12.

As illustrated in FIG. 11(a) and FIG. 11(b), a headrest support 19 of the present embodiment includes a metal portion 132 constituting its lower end region, and a resin portion 131 constituting the other part. The metal portion 32 is integrated with the resin portion 131 by insert molding. The resin portion 131 is provided with a projection portion 193 and beads 21, 22.

The metal portion 132 is formed in a tubular shape having a bottom portion in its lower end. A leaf spring 23 is formed integrally with an outer surface of the metal portion 132 on a rear side. The leaf spring 23 is a cantilever spring having a fixed end in its lower end and a free end in its upper end.

As illustrated in FIG. 12(a), such a headrest support 19 is disposed in a tiltable manner relative to a support bracket 18 in a state where the headrest support 19 is elastically supported by the leaf spring 23. The tilting of the headrest support 19 in a direction where the headrest 13 is displace forward is allowed to a position where a lower end of the metal portion 132 functioning as a stopper portion 194 abuts with an inner surface 182 of the support bracket 18 on the rear side, as illustrated in FIG. 12(b).

Note that each of the above embodiments can be modified as follows.

The weight 15 may not be embedded in the cushioning material 14 of the headrest 13.

The first bead 21 may be provided below the leaf spring 23 in the up-down direction. Further, the first bead 21 may be provided above the leaf spring 23 provided that the first bead 21 is placed at a position closer to the leaf spring 23 than the projection portion 193.

The height of the first bead 21 may be lowered than the height of the projection portion 193. In this case, it is possible to enlarge the swing range of the headrest 13 as compared with each of the above embodiments.

In the meantime, the height of the first bead 21 may be higher than the height of the projection portion 193.

The first bead 21 may be made of a material different from the material of the headrest support 19 provided that the material has a rigidity higher than the leaf spring 23.

The first bead 21 may be omitted provided that the second bead 22 is placed on the upper side relative to the projection portion 193. Even with this configuration, the rearward displacement of the headrest 13 can be regulated by the second bead 22.

The leaf spring 23 may be placed on the front side of the lower part of the headrest stay 16, and the first bead 21 may be placed on the rear side of the lower part of the headrest stay 16. In this case, it is preferable that the projection portion 193 be placed on the rear side of the upper part of the headrest stay 16 and the second bead 22 be placed on the front side of the upper part of the second bead 22.

Figure 13:
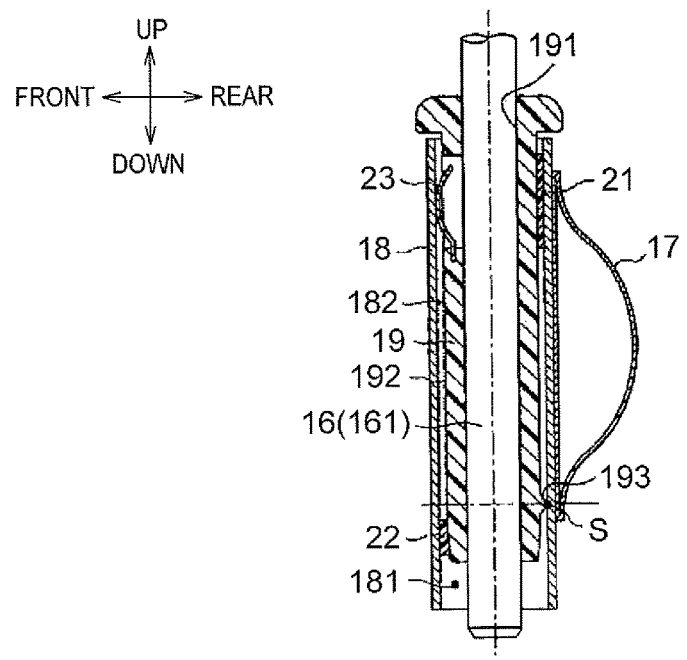
FIG. 13 is a sectional view illustrating a headrest support structure of another embodiment.

As illustrated in FIG. 13, the leaf spring 23 may be placed on the front side of the upper part of the headrest stay 16, and the projection portion 193 may be placed on the rear side of the lower part of the headrest stay 16. In this case, it is preferable that the first bead 21 be placed on the rear side of the upper part of the headrest stay 16 and the second bead 22 be placed on the front side of the lower part of the headrest stay 16. In this case, it is further preferable that the second bead 22 be placed on the lower side relative to the projection portion 193 in the up-down direction.

Figure 14:
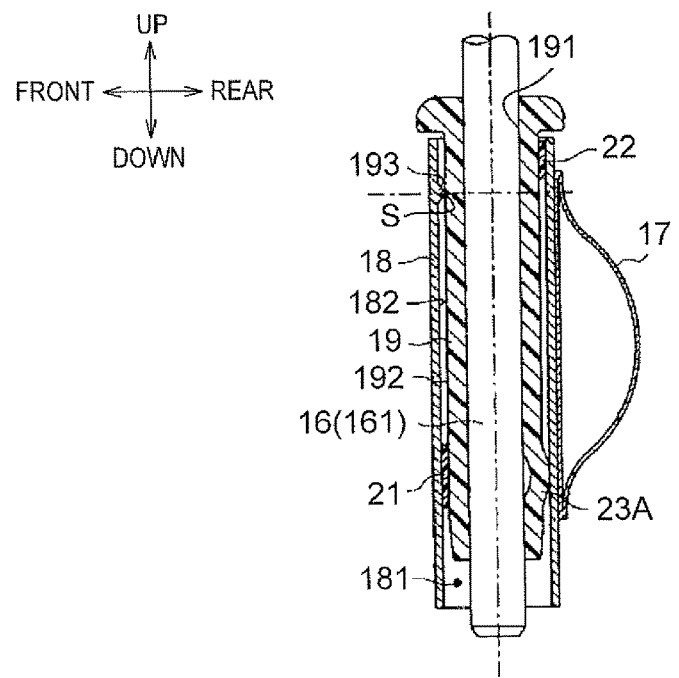
FIG. 14 is a sectional view illustrating a headrest support structure of another embodiment.

As illustrated in FIG. 14, the projection portion 193 may be configured to project toward the outer surface 192 of the headrest support 19 from the inner surface 182 of the support bracket 18 from among the outer surface 192 and the inner surface 182 which are opposed to each other. Even in this case, the headrest support 19 tilts in the front-rear direction with the tip of the projection portion 193 being taken as the fulcrum S.

Further, similarly as illustrated in FIG. 14, the spring may be an arch-shaped spring 23A configured such that part of the headrest support 19 is curved outwardly. The spring 23A is a double-holding spring in which both ends are fixed ends.

Figure 15:
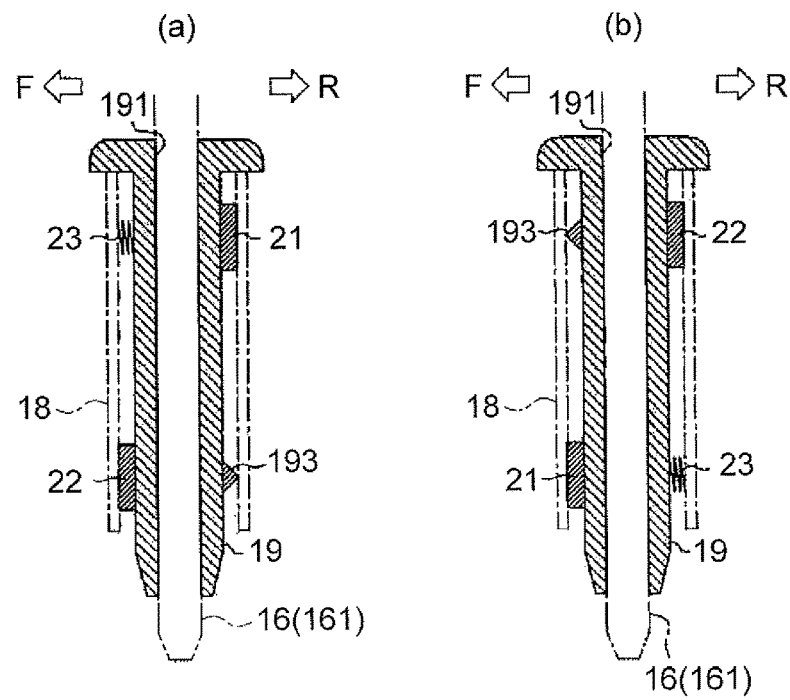
FIGS. 15(*a*) and 15(*b*) are sectional views each illustrating a headrest support structure according to another embodiment.

As illustrated in FIG. 15(a), the second bead 22 may be placed at the same position as the projection portion 193 in the up-down direction in the configuration illustrated in FIG. 13. Further, the projection portion 193 formed separately from the headrest support 19 may be fixed to the headrest support 19.

As illustrated in FIG. 15(b), the second bead 22 may be placed at the same position as the projection portion 193 in the up-down direction in the first embodiment. Further, the projection portion 193 formed separately from the headrest support 19 may be fixed to the headrest support 19.

Figure 16:
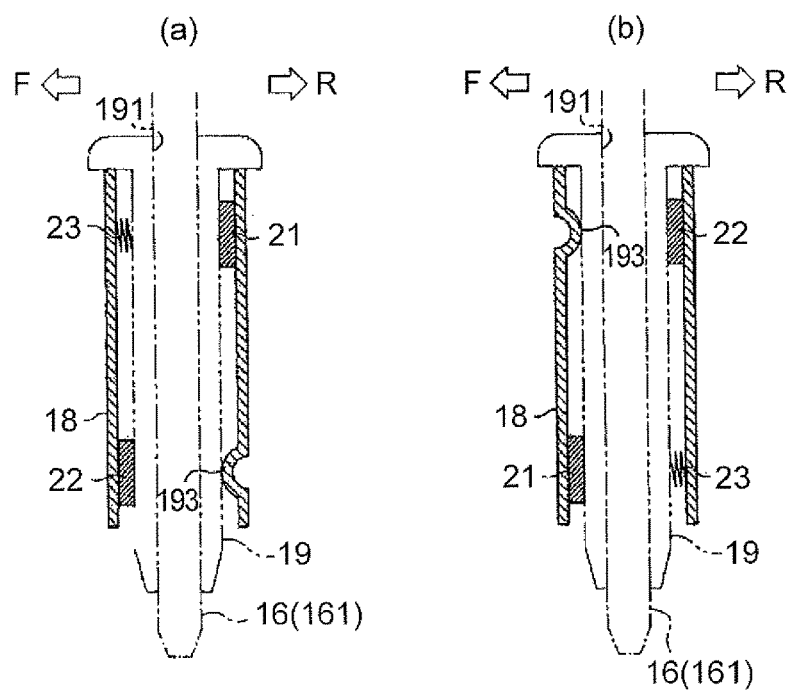
FIGS. 16(*a*) and 16(*b*) are sectional views each illustrating a headrest support structure according to another embodiment.

As illustrated in each of FIGS. 16(a) and 16(b), the projection portion 193 may be formed by hollowing a peripheral wall of the support bracket 18 inwardly in each of the configurations of FIGS. 15(a) and 15(b). The tip of the projection portion 193 abuts with the outer surface of the headrest support 19, and the headrest support 19 is tiltable with the tip of the projection portion 193 being taken as a fulcrum. Note that, in these configurations, the second bead 22 may be placed on an opposite side to the leaf spring 23 across the projection portion 193 in the up-down direction.

The second bead 22 may be placed at the same position as the projection portion 193 in the up-down direction as described above, or may be provided between the projection portion 193 and the leaf spring 23 in the up-down direction.

The second bead 22 may be made of a material different from the material of the headrest support 19 provided that the material has a rigidity higher than the leaf spring 23.

The second bead 22 may be omitted provided that the first bead 21 is provided. Even with this configuration, the rearward displacement of the headrest 13 can be regulated by the first bead 21.

The spring may be a coil spring. Further, the spring may be support by or attached to the support bracket 18, rather than the headrest support 19.

When a pulling spring is employed as the spring, the spring and the projection portion 193 may be placed on the front side of the headrest stay 16, or the spring and the projection portion 193 may be placed on the rear side of the headrest stay 16.

The projection portion 193 may not be mound-shaped, but can be formed in various shapes such as a conical shape, for example. The important thing is that the projection portion 193 has a tip that makes linear contact or point contact with the inner surface 182 of the support bracket 18 or the outer surface 192 of the headrest support 19.

Figure 17:
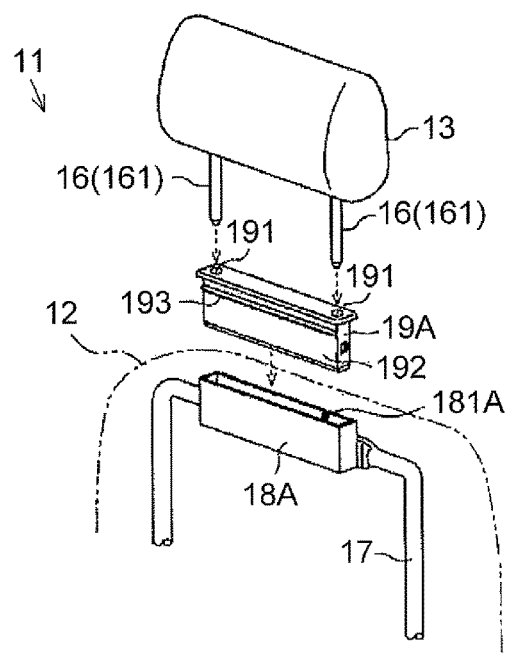
FIG. 17 is an exploded perspective view illustrating a headrest support structure of another embodiment.

As illustrated in FIG. 17, a headrest support 19A may have a rectangular solid shape. In this case, a stay hole 191 into which the tip portion 161 of the headrest stay 16 is inserted is formed in either side of the headrest support 19A in the vehicle width direction. That is, two headrest stays 16 are supported by one headrest support 19A. In this case, the headrest support 19A corresponds to a "support member."

Further, in a support structure employing such a headrest support 19A, it is preferable to employ one support bracket 18A having a large accommodation chamber 181A that can accommodate the headrest support 19A therein.

Figure 18:
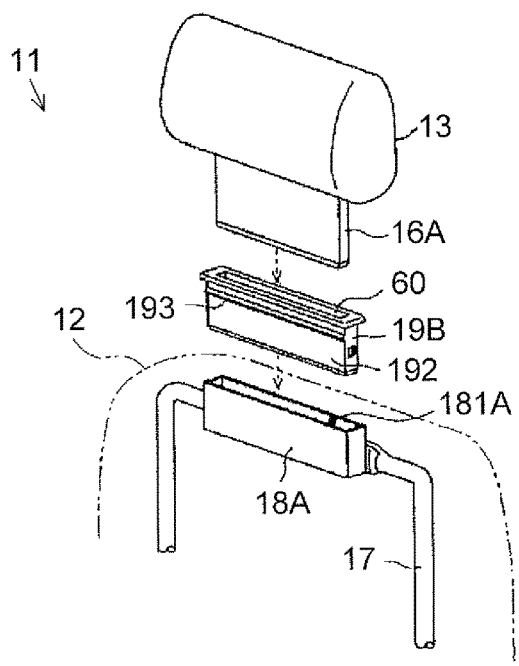
FIG. 18 is an exploded perspective view illustrating a headrest support structure of another embodiment.

Further, as illustrated in FIG. 18, a protruding member projecting from the headrest 13 may be one plate material 16A projecting toward the seatback 12. In this case, it is preferable that an insertion hole 60 having an opening extending in the vehicle width direction be provided in a headrest support 19B, and the plate material 16A be inserted into the insertion hole 60 from its upper opening. In this case, the headrest support 19B corresponds to the "support member."

By employing such a configuration, it is possible to restrain variation in reduction effect on the resonance frequency in the support structure which variation is caused due to manufacturing error or the like of one pair of headrest stays 16, as compared with each of the above embodiments.

What is claimed is:

1. A headrest support structure comprising:
   a support member configured to support a protruding member projecting from a headrest;
   a bracket provided in a seatback and having an accommodation chamber in which the support member is accommodated in a tiltable manner in a front-and-rear direction perpendicular to a width direction of the headrest;
   a spring provided in the accommodation chamber and deforming in a bending manner due to tilting of the support member relative to the bracket in the front-and-rear direction; and
   a projection portion projecting in the front-and-rear direction from one of an outer surface of the support member and an inner surface of the bracket which are opposed to each other and engaging the other of the surfaces at a single meeting point of the projection portion, the projection portion being provided at a position different from the leaf spring in a regulation direction perpendicular to both the front-and-rear direction and the width direction of the headrest, at least one gap filling body positioned opposite the projection portion relative to the support member and being centered at a position closer to the headrest than a center of the projection portion, wherein
   the headrest is biased rearward by the spring.

2. The headrest support structure according to claim 1, wherein
   the projection portion projects from one of the outer surface of the support member and the inner surface of the bracket which are opposed to each other, so as to abut with the other one thereof, and the support member is tiltable relative to the bracket in a state where a tip of the projection portion abutting with the other one is taken as a fulcrum.

3. The headrest support structure according to claim 1, wherein
   the projection portion is provided at a position closer to the headrest than the spring in the regulation direction.

4. The headrest support structure according to claim 1, wherein
   the spring is placed on a first side relative to the protruding member in the front-and-rear direction, and the projection portion is placed on a second side relative to the protruding member in the front-and-rear direction.

5. The headrest support structure according to claim 4, wherein
   the spring is placed on a rear side of the protruding member, and the projection portion is placed on a front side of the protruding member.

6. The headrest support structure according to claim 4, wherein
   the at least one gap filling body is provided in a first gap between the outer surface of the support member and the inner surface of the bracket which are opposed to each other, and the gap filling body is placed on a first end of the support member opposite to the spring beyond the projection portion in the regulation direction.

7. The headrest support structure according to claim 6, wherein
   the gap filling body is a first gap filling body; and
   a second gap filling body is provided in a second gap between the outer surface of the support member and the inner surface of the bracket which are opposed to each other, on a second end of the support member, and the second gap filling body is provided at a position closer to the spring than the projection portion in the regulation direction.

8. The headrest support structure according to claim 7, wherein the second gap filling body is placed at the same position as the spring in the regulation direction.

9. The headrest support structure according to claim 1, wherein a weight harder than a cushioning material of the headrest is embedded in the cushioning material.

10. The headrest support structure according to claim 1, wherein the projection portion has a structure different from the spring.

* * * * *